United States Patent Office 3,642,944
Patented Feb. 15, 1972

3,642,944
FIRE RETARDANT POLYESTERS AND ARTICLES MADE THEREFROM
Austin C. Abbott, Jr., Millbrae, Calif., assignor to The Sherwin-Williams Company, Cleveland, Ohio
No Drawing. Filed July 1, 1970, Ser. No. 51,684
Int. Cl. C08f 21/00, 21/02
U.S. Cl. 260—864
8 Claims

ABSTRACT OF THE DISCLOSURE

Fire retardant polyester compositions are made by the reaction of a brominated polyol and a chlorinated aromatic dibasic acid in which the weight ratio of chlorine to bromine is in the range from about 2:1 to about 6:1, and a vinyl monomer.

BACKGROUND OF THE INSTANT INVENTION

The instant invention relates to novel polymerizable mixtures capable of forming flame retardant, hardened, infusible, insoluble resins characterized by low smoke density and flame spread ratings.

Liquid thermosetting resin compositions of the unsaturated polyester type, as typified by a mixture of a linear propylene glycol maleate-phthalate polyester in admixture with ethylenically unsaturated monomers, such as monomeric styrene, as a cross-linking agent, are widely used in many fields. Unfortunately, such resins are combustible even when filled or reinforced with considerable percentages of non-combustible materials. This has hampered their use considerably in structural and decorative applications due to considerations of safety, increased insurance rates, and building code requirements. Accordingly, there is a great need for improved fire-resistant polyester resins. Various additives are known which have been used to reduce the fire hazard of the above-mentioned resins without undue sacrifice of physical and chemical properties, but with limited success. Particularly in the case of light-transmitting or of opaque light-colored resin formulations, the use of these additives, with known polyester compositions, has been less than successful.

British patent specification No. 1,164,084 discloses self-extinguishing polyester compositions of polyesters of dicarboxylic acids and 2,2-bis(bromomethyl)-1,3-propanediol (more conveniently called dibromoneopentyl glycol) in admixture with ethylenically unsaturated monomers, as a particular and unexpected improvement in the known art of preparing halogen-containing polyesters by reacting an unsaturated alpha-beta-ethylenically unsaturated acid or anhydride with a halogenated polyol or glycol, which can then be reacted with olefinic monomers such as, styrene, divinylbenzene, methyl methacrylate and diallyl phthalate to form polymerized insoluble, infusible cross-linked products. More specifically, it discloses a composition of (A) a bromine-containing polyester of 2,2-bis-(bromomethyl)-1,3-propanediol and a mixture of at least one aliphatic unsaturated dicarboxylic acid or anhydride and an aromatic or cycloaliphatic dicarboxylic acid or anhydride, (B) a non-halogen-containing unsaturated polyester and (C) a vinyl aromatic monomer or an ester of acrylic or methacrylic acid. It is known that bromine-containing unsaturated polyester resins are more fire-resistant than those containing equal parts by weight of chlorine. But it is also recognized that the use of bromine as a flame suppressant results in polyester resins that are darker in color and more subject to discoloration when exposed to use under normal conditions. In addition, there is a strict limit upon the amount of bromine that might be incorporated in a polyester, not to mention the great expense of using large quantities of bromine strictly for its fire retardant contribution. The instant invention overcomes the prior art disadvantages.

The importance of imparting fire retardant characteristics to building materials such as panels, sheeting and the like which are made from glass mat impregnated with unsaturated polyesters, is widely recognized. By and large, it is not practical to make an organic based polyester resin completely fire-resistant. However, it is desirable to give such material sufficient fire retardant properties to delay the spread of fire to minimize the damage inflicted, and to purchase precious time during which help might be sought. Two critical properties which are of inestimable importance under fire conditions are flame spread and smoke density. Needless to say, if a flame spread rating on the resin is very low, the fire will stay relatively well-confined. The importance of a low smoke density rating is that it permits visual observation of the extent of the damage and of particular points in the fire which require critical and immediate attention. In addition to flame spread and smoke density it has been found that a resin exhibiting high intumescence provides better protection against heat which is of high importance with regard to the load bearing ability of members, most particularly if the members get warped. The instant resin unexpectedly provides all the above benefits in a degree comparable to or superior to those provided by solely brominated resins, but at a most advantage.

SUMMARY

It has been discovered that fire retardant properties of unsaturated polyesters can be obtained by using a chlorinated aromatic dicarboxylic acid, or anhydride and dibromoneopentyl glycol in conjunction with aliphatic dicarboxylic acids and aliphatic diols, in particular proportions so that the weight ratio of chlorine to bromine is in the range from 2:1 to about 6:1. Unsaturated polyesters obtained in this manner may be polymerized with vinyl monomers which may then be cured to yield infusible, insoluble polymers which have exceedingly light color and high stability to discoloration to prolonged exposure to light.

The instant resin avoids the high cost of obtaining desired fire retardance using only a brominated polyol and both the cost and inherent instability of a halogenated dicarboxylic acid of relatively high molecular weight.

Polymers which are compounded with the above-defined ratio of chlorine to bromine, chlorine being a substituent in the aromatic dicarboxylic acid and bromine being a substituent in the polyol, have values for flame spread and smoke density comparable with, or superior to, those for polymers which contain either (a) the same total weight percent of halogen either solely in the aromatic dicarboxylic acid or in the polyol, or (b) the same total weight percent of bromine irrespective of where the bromine is present, offering polymerizable compositions having lower color levels, with comparable or better exposure stability, and at far less cost. Impregnation of glass mat for panels and other structural materials with the instant resins permits the fabrication of structures with very good mechanical properties which at the same time have the desirable characteristics of low smoke density and flame spread.

PREFERRED EMBODIMENT

The instant chlorine and bromine-containing polyester can be prepared by reacting a chlorinated aromatic dicarboxylic acid or anhydride with a brominated polyol in a proportion in a molar range so as to provide from about 2 to about 6 times by weight as much chlorine as bromine, together with a non-halogenated polyol in the range from about 4 to about 15 mols of non-halogenated polyol per mol of brominated polyol, and an aliphatic unsaturated dicarboxylic acid or anhydride in the range from about 2 to about 10 mols of aliphatic anhydride per mol of brominated polyol. A preferred molar ratio of said chlorinated aromatic dicarboxylic acid to said unsaturated dicarboxylic acid is in the range from about 1:2 to about 2:1. Preferred aromatic and cycloaliphatic dicarboxylic acids and anhydrides are the chloro derivatives of phthalic anhydride, tetrahydrophthalic acid, and hexahydrophthalic acid. Preferred aliphatic unsaturated dicarboxylic acids and anhydrides are maleic acid, maleic anhydride, fumaric acid, itaconic acid, citraconic acid and citraconic anhydride. Reaction mixtures preferably contain a molar excess of diol over dicarboxylic acid and/or anhydride.

The unsaturated chlorine and bromine-containing polyester obtained is usually employed in a mixture with one or more monomers such as vinyl aromatic compounds or alkyl esters of acrylic or methacrylic acid which may then be cured to form infusible, insoluble products which, along with possessing good mechanical properties, have high intumescence, extremely good flame spread and smoke density ratings, and are highly resistant to discoloration despite prolonged exposure to light.

The vinyl aromatic monomer, or ester of acrylic or methacrylic acid, to be employed as the olefinic cross-linking agent may be a vinyl or vinylidene monomer such as for example, styrene, vinyltoluene, vinylxylene, ethylvinylbenzene, isopropylstyrene, tert.-butylstyrene, fluorostyrene, chlorostyrene, dichlorostyrene, bromostyrene, ethyl acrylate, methyl methacrylate, butyl methacrylate, 2-ethylhexyl acrylate, propyl acrylate, isobutyl acrylate, methyl acrylate, butyl methacrylate, or mixtures of any two or more of such vinyl or vinylidene compounds. The preferred vinyl aromatic monomers have the general formula

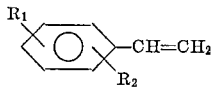

wherein $R_1$ and $R_2$ each independently represent hydrogen, halogen or alkyl radicals having from 1 to 4 carbon atoms.

The preferred acrylic or methacrylic ester monomers have the general formula

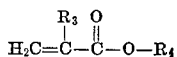

wherein $R_3$ is hydrogen or methyl, and $R_4$ is an alkyl radical having from 1 to 8 carbon atoms. The ethylenically unsaturated monomer may be employed in an amount from 30 to 45 percent by weight of the composition.

The chlorine and bromine-containing unsaturated polyester is advantageously used in amounts corresponding to from about 55 to about 70 percent by weight of the composition and sufficient to provide a total of from about 15 to about 25 percent by weight of halogen in the product. Best results are usually obtained by employing an amount of polycondensate slightly in excess of the stoichiometric proportion of the monomer, i.e. in excess of one gram molecular proportion of the polycondensate for each gram equivalent ethylene double bond in the vinyl monomer used.

A preferred procedure for making the composition of the instant invention comprises introducing the selected ingredients, in predetermined proportions, into a suitable esterification reaction vessel equipped with heating and/or cooling means, an agitator, means for maintaining an atmosphere of an inert gas such as nitrogen, helium, or carbon dioxide, over the reaction mixture, means for removing water of esterification suitably, as it is formed in the reaction, means for introducing inert liquid diluents, and other accessories to the reaction. The reactants are blanketed with an inert atmosphere, preferably nitrogen gas, and the reaction mass is heated slowly until the agitation can conveniently be started. After heating has progressed sufficiently so that the agitation can be stepped up, heat is applied more vigorously so that the temperature of the reaction mass reaches in the range from about 360° to about 420° F. in from 1 to 3 hours. During the upheat period, after the mass has become fluid, a quantity of an inert liquid diluent such as toluene, xylene, or ethylbenzene may be added to the reaction mass. A preferred quantity of inert diluent is from about 2 to about 10 percent by weight of the total reaction mass-solvent blend in the reaction vessel.

After the reaction has been heated to a temperature in the range from about 350° to about 380° F., the polycondensation of the reactants commences as evidenced by liberation of water of reaction. The temperature of the distillate vapors emerging from the top of the partial condenser is controlled in the range from about 200° to about 250° F. to minimize the loss of polyol in the ternary mixture of water, inert diluent and polyol, and the reaction is continued until from about 75 to about 30 milligrams of potassium hydroxide is required to neutralize the unreacted acid in one gram of polymer solids, using phenolphthalein as an indicator. After a suitable reaction period, generally less than 7 hours, the reaction is stopped and the reaction mass vented to a suitable fume removal system, and inert gas is bubbled through the mass to remove as much of the solvent as possible. The temperature of the reaction mass is maintained in the range from about 360° to about 420° F. When the acid number is about 40, and viscosity of the polymer is such that about 60 parts of polymer dissolved in about 40 parts of a suitable solvent given a solution viscosity of from about 0.25 to about 2.25 stokes, heating is discontinued and the polycondensate is thinned with from about 55 to about 70 parts by weight of vinyl monomer suitably doctored with known inhibitors such as quinones, hydroquinones, and the like. Curing is usually effected in the presence of a known catalyst or initiator for the polymerization, such as an organic peroxygen compound. Activators or catalyst may be employed in an amount less than 1 percent by weight of the reaction mass and preferably in the range from about .005 to about .1 percent. Known fillers, pigments, fire retardant additives and the like may be incorporated either in the polycondensate mixture or in the vinyl monomer, or both, either before, during or after the reaction.

Reference to an acid herein contemplates either the acid or the anhydride thereof, where such anhydride exists. In the following examples all parts are parts by weight unless otherwise denoted.

EXAMPLE 1

A halogen containing polycondensation polymer is prepared in the following manner:

A round-bottomed, three-necked flask is fitted with an agitator, inert gas inlet tube, a recording thermocouple and a sampling tube. A vapor condensing system to provide either partial condensation or total condensation with a return line to the flask is also provided. The following ingredients are weighed into the flask:

| | Pbw[1] | Gram mols |
|---|---|---|
| Propylene glycol | 979 | 12.875 |
| Maleic anhydride | 490 | 5.0 |
| Tetrachloro orthophthalic anhydride | 2,346 | 7.5 |
| Dibromoneopentyl glycol | 393 | 1.5 |
| Theoretical yield | 3,985 | |

[1] Pbw corresponds to parts by weight.

Heat is applied by means of an electric heating mantle or other suitable means and the reaction mass is heated slowly under an inert atmosphere of carbon dioxide, nitrogen or other nonreactive gas until the agitation can conveniently be started.

After heating has progressed sufficiently so that agitation can be started, heat is applied more vigorously so that the temperature of the reaction mass reaches from about 360° F. to 420° F. in from 1 to 3 hours. During the upheat period, after the mass has become fluid, a quantity of inert diluent such as toluene, xylene or ethyl benzene is added to the reaction mass, preferably to the extent of from about 2 to about 10% by weight of the total contents in the flask.

After the reaction mass has been heated to from about 350° F. to about 380° F., the polycondensation of the reactants commences as evidenced by liberation of water of reaction which distills over. From the start of this reaction until the reaction has progressed to a point where from about 75 to about 30 mgs. of potassium hydroxide is required to neutralize the unreacted acid in one gram of polymer solids, using phenolphthalein as indicator, the temperature of the distillate vapors emerging from the top of the partial condenser is controlled in the range from about 200° F. to about 250° F. to minimize the loss of propylene glycol in the ternary mixture of water of reaction, diluent and glycol.

After suitable reaction period, generally less than 12 hours and preferably less than 7 hours, the number of mgs. of KOH required to neutralize the free acid in one gram of resin solids to a phenolphthalein pink end point is from about 50 to about 30 mgs. The reaction mass is vented to a suitable fume removal system and inert gas is bubbled through the mass to remove as much of the solvent as possible. The mass temperature is maintained at from 360° F. to 420° F. for a period ranging from about ¼ hour to about 2 hours until the major portion of the diluent has been removed. The heating is discontinued and the polycondensate is thinned with 35 parts of styrene. Inhibitors, catalysts and the like may be added if necessary.

When cooled to about 77° F. the resulting halogenated polycondensate-vinyl monomer solution has an acid value of from about 15 to about 65 based on the halogenated polycondensate polymer. The condensate-vinyl monomer resin mixture containing 35% by weight styrene has a light straw color with a maximum Gardner Delta color of 5. The resulting polymer contains 5.7% bromine and 22% chlorine based on solids. The total halogen content of the polymer, based on solids, is 27.7%.

A 30 mil thickness of the polymerizable resin composition formed as described hereinabove was coated and cured on a plywood panel, strips of which were subjected to the tunnel test in accordance with the procedures of ASTM E-84. The measurements of flame spread and smoke density compared favorably with or were superior to those of known compositions containing the same weight percent halogen.

EXAMPLE 2

A resin composition is made exactly as described in Example 1 of British specification No. 1,164,084 except that the amounts of the ingredients are altered so as to result in a bromine content of the polymer, based on solids, of 27.7%. The casting resin is made up so as to contain 35% by weight styrene.

Equivalent thicknesses of the prior art resin as formed in this example and the resin of Example 1 hereinabove, are coated and cured on plywood panels. Strips of the panels are subjected to the ASTM E-84 tunnel test. The results indicate that the flame spread and smoke density ratings of the resin of Example 1 are comparable with or superior to the resin of Example 2.

EXAMPLE 3

The same procedure as outlined in Example 1 hereinabove is followed. The ingredients charged simultaneously to the flask are as follows:

| | Parts by wt. |
|---|---|
| Propylene glycol | 979.659 |
| Maleic anhydride | 490.30 |
| Tetrachloro orthophthalic anhydride | 2,346.975 |
| Dibromoneopentyl glycol | 392.943 |
| Total to flask | 4,209.877 |
| Theoretical loss | 225.00 |
| Theoretical yield | 3,984.877 |

The mixture is catalyzed with 1% by weight of a 60% methylethyl ketone peroxide in a suitable diluent and allowed to cure at ambient temperature.

65 parts by weight of the polycondensate are mixed with 35 parts styrene and the polymerizable composition is coated and cured on a plywood panel. Strips of the plywood panel are subjected to the tunnel test. Flame spread and smoke density ratings were comparable with or superior to known resins containing the same weight percent bromine as a substituent solely in the aliphatic diol.

EXAMPLE 4

The procedure outlined in Example 2 hereinabove is followed except that the amounts of the ingredients are selected so as to result in a bromine content equivalent in weight to the total halogen content of the resin described hereinabove in Example 3.

Equivalent thicknesses of the brominated resin described herein and the resin of Example 3 described hereinabove are coated and cured on plywood panels. Sections of the plywood panels are then subjected to the tunnel test. Flame spread and smoke density ratings indicate that the resin of Example 3 is comparable with or superior to that of this Example 4.

EXAMPLE 5

The procedure of Example 1 hereinabove is followed to yield a polymerizable composition containing 65% polycondensate and 35% vinyl monomeric resin, and containing 27.7% by weight chlorine, present entirely as tetrachloro orthophthalic anhydride.

EXAMPLE 6

The procedure of Example 5 is utilized to form a polycondensate containing 27.7% by weight bromine present entirely in the aliphatic diol, namely dibromoneopentyl glycol.

EXAMPLE 7

The procedure of Example 5 is followed so as to form a resin containing 27.7% by weight chlorine divided substantially equally as a substituent in tetrachloro phthalic anhydride and dichloroneopentyl glycol.

EXAMPLE 8

The procedure followed in Example 5 is utilized to form a polymerizable composition containing equal proportions by weight of bromine in tetrabromo phthalic anhydride and dibromoneopentyl glycol.

The resins of Examples 5 through 8 were coated and cured in equivalent thicknesses on plywood panels. Strips of the panels were subjected to the tunnel test and the flame spread and smoke density values were recorded. The results indicate that the flame spread and smoke density ratings of the resins were generally less favorable than those resins of Examples 1 and 3.

EXAMPLE 9

The procedure of Example 1 was followed, except that to 55 parts of the polymerizable composition were added 33.8 parts ammonium polyphosphate, 11.2 parts monomeric melamine, and minor quantities of titanium dioxide and pentaerithrytol were added to the blend. The resin is coated and cured on a plywood panel and strips are subjected to the tunnel test. Visual inspection indicates that the resin in combination with the additives specified, exhibits unexpectedly high intumescence.

EXAMPLE 10

The procedure of Example 2 hereinabove (as described in Example 1 of British Pat. 1,164,084) was followed so as to yield 15% by weight bromine in the polymerizable resin. The same procedure was followed to yield a resin containing 20% by weight bromine. Both resins are coated and cured in equivalent thicknesses on a plywood panel. Strips of the plywood panel are subjected to the tunnel test. The results indicate that the flame spread and smoke density ratings are indistinguishable, indicating that the increase in the halogen content provides no benefit in flame spread and smoke density ratings.

EXAMPLE 11

The procedure of Example 1 was followed to make resin compositions containing 15% by weight total halogen, 20% by weight total halogen and 25% by weight total halogen. In each case 4.5 times as much chlorine as bromine, by weight, is present. Each of the four polymerizable resin compositions are coated and cured in equivalent thicknesses on plywood panels. Strips of the panels were subjected to the tunnel test which indicate that the flame spread and smoke density ratings were progressively better, i.e., the higher the halogen content, the better the fire retardant characteristics of the resin.

I claim:
1. A polymerizable composition comprising (A) from 55 to 70 percent by weight of a polycondensate containing from 20 to 45 percent by weight bromine and chlorine combined, and having from about 2 to about 6 times as much chlorine as bromine by weight, said polycondensate being formed by the simultaneous reaction of a nonhalogenated aliphatic diol, a brominated aliphatic polyol, an aliphatic unsaturated dicarboxylic acid and a chlorinated aromatic carbocyclic dicarboxylic acid, there being simultaneously present in the charge to form said polycondensate from about 4 to about 15 mols of said aliphatic diol per mol of said brominated aliphatic polyol and sufficient chlorinated aromatic carbocyclic dicarboxylic acid and dibromoneopentyl glycol to supply the specified ratio of chlorine to bromine, and (B) from 30 to 45 percent by weight of a co-polymerizable compound selected from a monovinyl aromatic compound, represented by the general formula:

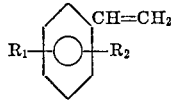

wherein $R_1$ and $R_2$ each represent a member independently selected from the group consisting of hydrogen, halogen and alkyl radicals containing from 1 to 4 carbon atoms, and an unsaturated ester represented by the general formula:

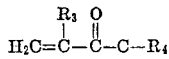

wherein $R_3$ is independently selected from hydrogen and methyl, and $R_4$ is an alkyl radical with from 1 to 8 carbon atoms.

2. The composition of claim 1 wherein said brominated aliphatic polyol is 2,2-bis-(bromomethyl)-1,3-propane diol.

3. The composition of claim 1 wherein (A) includes in addition a nonhalogenated aromatic carbocyclic dicarboxylic acid in an amount less than 20 percent by weight of said chlorinated aromatic carbocyclic dicarboxylic acid.

4. The composition of claim 1 wherein said aliphatic diol is propylene glycol, and said unsaturated dicarboxylic acid is maleic anhydride.

5. The composition of claim 1 wherein the molar ratio of said chlorinated aromatic carbocyclic dicarboxylic acid to said unsaturated dicarboxylic acid is in the range from about 1:2 to about 2:1.

6. The composition of claim 1 wherein the halogen content is in the range from about 15 to about 35 percent by weight.

7. The composition of claim 1 wherein from about 55 to about 71.5 parts by weight of said polymerizable composition is blended with from about 28.5 to about 45 parts by weight of ammonium polyphosphate and monomeric melamine combined, the ratio of ammonium polyphosphate to monomeric melamine being in the range from about 2:1 to about 4:1.

8. An insoluble infusible, flame retardant resinous product of the polymerization of a composition according to claim 1.

References Cited

UNITED STATES PATENTS

| 3,039,980 | 6/1962 | Mallison | 260—22 |
| 3,507,933 | 4/1970 | Larsen et al. | 260—869 |

FOREIGN PATENTS

| 6601377 | 8/1966 | Netherlands. |

OTHER REFERENCES

Lawrence, Polyester Resins (pp. 83–84), Reinhold, New York 1960.
Pape et al., Chem. Abstr. 70, 88490p (1969).
Chae et al., Chem. Abstr. 67, 54673y (1967).

MELVIN GOLDSTEIN, Primary Examiner

U.S. Cl. X.R.

117—148; 260—75 H, 869, DIG. 24